(12) United States Patent
Strandborg et al.

(10) Patent No.: US 12,159,349 B2
(45) Date of Patent: Dec. 3, 2024

(54) IMAGE-TILES-BASED ENVIRONMENT RECONSTRUCTION

(71) Applicant: Varjo Technologies Oy, Helsinki (FI)

(72) Inventors: Mikko Strandborg, Hangonkylä (FI); Kimmo Roimela, Tampere (FI); Pekka Väänänen, Espoo (FI)

(73) Assignee: Varjo Technologies Oy, Helsinki (FI)

( * ) Notice: Subject to any disclaimer, the term of this patent is extended or adjusted under 35 U.S.C. 154(b) by 264 days.

(21) Appl. No.: 17/971,729

(22) Filed: Oct. 24, 2022

(65) Prior Publication Data

US 2024/0135644 A1 Apr. 25, 2024
US 2024/0233264 A9 Jul. 11, 2024

(51) Int. Cl.
*G06T 17/20* (2006.01)
*G06T 15/04* (2011.01)
*G06T 15/20* (2011.01)

(52) U.S. Cl.
CPC .............. *G06T 17/20* (2013.01); *G06T 15/04* (2013.01); *G06T 15/20* (2013.01)

(58) Field of Classification Search
CPC .......... G06T 17/20; G06T 15/04; G06T 15/20
See application file for complete search history.

(56) References Cited

U.S. PATENT DOCUMENTS

2018/0310025 A1* 10/2018 Keränen ................ G06T 17/005
2018/0357819 A1* 12/2018 Oprea ..................... G06T 19/00
2020/0364893 A1* 11/2020 Shtok ....................... G06T 7/60

FOREIGN PATENT DOCUMENTS

WO 2019138163 A1 7/2019

OTHER PUBLICATIONS

Bayakovski et al., "Depth Image-Based Representations for Static and Animated 3D Objects" International Conference on Image Processing, IEEE, vol. 3, Sep. 22, 2002, ISBN: 978-0-7803-7622-9, 4 pages.
Chang et al., "LDI Tree: A Hierachiacial Representation for Image-Based Rendering" Computer Graphics Proceedings, Annual Conference Series, Aug. 8, 1999, 8 pages.
European Patent Office, Extended European Search Report, Application No. 23201783.0, mailed Mar. 15, 2024, 16 pages.

(Continued)

*Primary Examiner* — Michelle Chin
(74) *Attorney, Agent, or Firm* — Ziegler IP Law Group LLC.

(57) ABSTRACT

A method including: receiving colour images, depth images, and viewpoint information; dividing 3D space occupied by real-world environment into 3D grid(s) of voxels (204); creating 3D data structure(s) comprising nodes, each node representing corresponding voxel; dividing colour image and depth image into colour tiles and depth tiles, respectively; mapping colour tile to voxel(s) whose colour information is captured in colour tile, based on depth information captured in corresponding depth tile and viewpoint from which colour image and depth image are captured; and storing, in node representing voxel(s), reference information indicative of unique identification of colour tile that captures colour information of voxel(s) and corresponding depth tile that captures depth information, along with viewpoint information indicative of viewpoint from which colour image and depth image are captured.

27 Claims, 3 Drawing Sheets

(56) References Cited

OTHER PUBLICATIONS

Zhirkov, "Binary Volumetric Octree Representation for Image-Based Rendering" Proceedings of GraphiCon, Sep. 10, 2001, http://graphicon.ru/html/2001/Image_Processing/Zhirkov.pdf, 4 pages.
Zhirkov, "View-Dependent Octree Image Rendering" Graphicon 2003 Proceedings, Sep. 5-10, 2003, http://graphicon.ru/html/2003/Proceedings/Technical/paper804.pdf, 5 pages.

* cited by examiner

IMAGE-TILES-BASED ENVIRONMENT RECONSTRUCTION

TECHNICAL FIELD

The present disclosure relates to computer-implemented methods incorporating image-tiles-based environment reconstruction. The present disclosure also relates to systems incorporating image-tiles-based environment reconstruction. The present disclosure further relates to computer program products incorporating image-tiles-based environment reconstruction.

BACKGROUND

With advancements in evolving technologies such as immersive extended-reality (XR) technologies, demand for high-quality image generation has been increasing. It is desired that the image generation is performed in real time or near-real time. Several advancements are being made to develop image generation techniques that facilitate high-quality and realistic three-dimensional (3D) reconstruction of a real-world environment. Some existing image generation techniques typically rely on environment reconstruction using 3D point clouds, 3D meshing, machine learning (ML)-based approaches (for example, such as Neural Radiance Fields (NeRFs)), image-based techniques, and the like.

However, existing techniques and equipment for implementing 3D reconstruction are associated with several limitations. Firstly, the existing techniques are inefficient in terms of managing a memory budget for storing data structures comprising information pertaining to a 3D space of the real-world environment. In such a case, when these data structures are employed as input for generating images from new viewpoints, image reconstruction is performed with considerable latency/delay. Moreover, when it is required to perform the image reconstruction in real time, the existing techniques cannot be scaled up to a high enough quality on the existing equipment. This adversely impacts viewing experiences provided by the evolving XR technologies which utilize the images generated using such data structures. Secondly, some existing techniques incorrectly and redundantly store object information (such as information pertaining to high frequency features of objects) into the data structures. For example, some nodes of the data structure may be partially empty when geometric surfaces of the object intersect with near clipping planes or far clipping planes of viewpoints of cameras, or when an input image has a self-occluding geometry. Thirdly, some existing techniques perform image reconstruction based on multiple reprojections and multiple resampling of input images. This causes extreme degradation of image quality in reconstructed images. Such degradation is caused because of an availability of a very limited, small number of full-size images that can be used for real-time image reconstruction, due to limitations of both system memory size and bandwidth. Fourthly, some existing techniques require encoders/decoders when input images for the 3D reconstruction are received by a server in a compressed stream. This considerably increases processing complexity, and processing resources and time required for said 3D reconstruction.

Therefore, in light of the foregoing discussion, there exists a need to overcome the aforementioned drawbacks associated with existing techniques and equipment for implementing 3D reconstruction.

SUMMARY

The present disclosure seeks to provides a computer-implemented method incorporating image-tiles-based environment reconstruction. The present disclosure also seeks to provide a system incorporating image-tiles-based environment reconstruction. The present disclosure further seeks to provide a computer program product incorporating image-tiles-based environment reconstruction. An aim of the present disclosure is to provide a solution that overcomes at least partially the problems encountered in prior art.

In a first aspect, an embodiment of the present disclosure provides a computer-implemented method comprising:
  receiving a plurality of colour images of a given real-world environment, a plurality of depth images corresponding to the plurality of colour images, and viewpoint information indicative of corresponding viewpoints from which the plurality of colour images and the plurality of depth images are captured, wherein three-dimensional (3D) positions and orientations of the viewpoints are represented in a given coordinate system;
  dividing a 3D space occupied by the given real-world environment into at least one 3D grid of voxels, wherein the at least one 3D grid is represented in the given coordinate system;
  creating at least one 3D data structure comprising a plurality of nodes, each node representing a corresponding voxel of the 3D space occupied by the given real-world environment;
  dividing a given colour image and a given depth image corresponding to the given colour image into a plurality of colour tiles and a plurality of depth tiles, respectively, wherein the plurality of depth tiles correspond to respective ones of the plurality of colour tiles;
  mapping a given colour tile of the given colour image to at least one voxel in the at least one 3D grid whose colour information is captured in the given colour tile, based on depth information captured in a corresponding depth tile of the given depth image and a given viewpoint from which the given colour image and the given depth image are captured; and
  storing, in a given node of the at least one 3D data structure representing the at least one voxel, reference information indicative of unique identification of the given colour tile of the given colour image that captures the colour information of the at least one voxel and the corresponding depth tile of the given depth image that captures the depth information, along with viewpoint information indicative of the given viewpoint from which the given colour image and the given depth image are captured.

In a second aspect, an embodiment of the present disclosure provides a system comprising at least one server and at least one data repository communicably coupled to the at least one server, wherein the at least one server is configured to:
  receive a plurality of colour images of a given real-world environment, a plurality of depth images corresponding to the plurality of colour images, and viewpoint information indicative of corresponding viewpoints from which the plurality of colour images and the plurality of depth images are captured, wherein three-dimensional (3D) positions and orientations of the viewpoints are represented in a given coordinate system;
  divide a 3D space occupied by the given real-world environment into at least one 3D grid of voxels, wherein the at least one 3D grid is represented in the given coordinate system;
  create at least one 3D data structure comprising a plurality of nodes, each node representing a corresponding voxel of the 3D space occupied by the given real-world environment, wherein the at least one 3D data structure is stored at the at least one data repository;

divide a given colour image and a given depth image corresponding to the given colour image into a plurality of colour tiles and a plurality of depth tiles, respectively, wherein the plurality of depth tiles correspond to respective ones of the plurality of colour tiles;

map a given colour tile of the given colour image to at least one voxel in the at least one 3D grid whose colour information is captured in the given colour tile, based on depth information captured in a corresponding depth tile of the given depth image and a given viewpoint from which the given colour image and the given depth image are captured; and store, in a given node of the at least one 3D data structure representing the at least one voxel, reference information indicative of unique identification of the given colour tile of the given colour image that captures the colour information of the at least one voxel and the corresponding depth tile of the given depth image that captures the depth information, along with viewpoint information indicative of the given viewpoint from which the given colour image and the given depth image are captured.

In a third aspect, an embodiment of the present disclosure provides a computer program product comprising a non-transitory machine-readable data storage medium having stored thereon program instructions that, when executed by a processor, cause the processor to execute steps of a computer-implemented method of the first aspect.

Embodiments of the present disclosure substantially eliminate or at least partially address the aforementioned problems in the prior art, and facilitates in creating space-efficient 3D data structure that is based on image tiles, thereby enabling generation of images having high realism and high visual fidelity in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 2B illustrates the colour image being divided into a plurality of colour tiles, while

Figure 1:
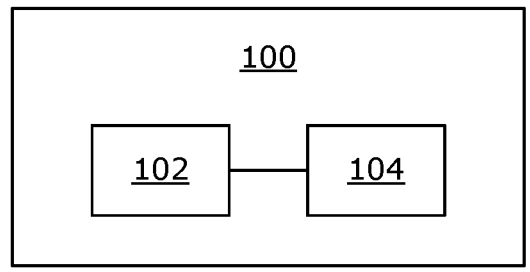
FIG. 1 illustrates a block diagram of an architecture of a system incorporating image-tiles-based environment reconstruction, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a computer-implemented method comprising:

receiving a plurality of colour images of a given real-world environment, a plurality of depth images corresponding to the plurality of colour images, and viewpoint information indicative of corresponding viewpoints from which the plurality of colour images and the plurality of depth images are captured, wherein three-dimensional (3D) positions and orientations of the viewpoints are represented in a given coordinate system;

dividing a 3D space occupied by the given real-world environment into at least one 3D grid of voxels, wherein the at least one 3D grid is represented in the given coordinate system;

creating at least one 3D data structure comprising a plurality of nodes, each node representing a corresponding voxel of the 3D space occupied by the given real-world environment;

dividing a given colour image and a given depth image corresponding to the given colour image into a plurality of colour tiles and a plurality of depth tiles, respectively, wherein the plurality of depth tiles correspond to respective ones of the plurality of colour tiles;

mapping a given colour tile of the given colour image to at least one voxel in the at least one 3D grid whose colour information is captured in the given colour tile, based on depth information captured in a corresponding depth tile of the given depth image and a given viewpoint from which the given colour image and the given depth image are captured; and storing, in a given node of the at least one 3D data structure representing the at least one voxel, reference information indicative of unique identification of the given colour tile of the given colour image that captures the colour information of the at least one voxel and the corresponding depth tile of the given depth image that captures the depth information, along with viewpoint information indicative of the given viewpoint from which the given colour image and the given depth image are captured.

In a second aspect, an embodiment of the present disclosure provides a system comprising at least one server and at least one data repository communicably coupled to the at least one server, wherein the at least one server is configured to:
  receive a plurality of colour images of a given real-world environment, a plurality of depth images corresponding to the plurality of colour images, and viewpoint information indicative of corresponding viewpoints from which the plurality of colour images and the plurality of depth images are captured, wherein three-dimensional (3D) positions and orientations of the viewpoints are represented in a given coordinate system;
  divide a 3D space occupied by the given real-world environment into at least one 3D grid of voxels, wherein the at least one 3D grid is represented in the given coordinate system;
  create at least one 3D data structure comprising a plurality of nodes, each node representing a corresponding voxel of the 3D space occupied by the given real-world environment, wherein the at least one 3D data structure is stored at the at least one data repository;
  divide a given colour image and a given depth image corresponding to the given colour image into a plurality of colour tiles and a plurality of depth tiles, respectively, wherein the plurality of depth tiles correspond to respective ones of the plurality of colour tiles;
  map a given colour tile of the given colour image to at least one voxel in the at least one 3D grid whose colour information is captured in the given colour tile, based on depth information captured in a corresponding depth tile of the given depth image and a given viewpoint from which the given colour image and the given depth image are captured; and
  store, in a given node of the at least one 3D data structure representing the at least one voxel, reference information indicative of unique identification of the given colour tile of the given colour image that captures the colour information of the at least one voxel and the corresponding depth tile of the given depth image that captures the depth information, along with viewpoint information indicative of the given viewpoint from which the given colour image and the given depth image are captured.

In a third aspect, an embodiment of the present disclosure provides a computer program product comprising a non-transitory machine-readable data storage medium having stored thereon program instructions that, when executed by a processor, cause the processor to execute steps of a computer-implemented method of the first aspect.

The present disclosure provides the aforementioned method, the aforementioned system, and the aforementioned computer program product for facilitating creation of the at least one 3D data structure that is based on image tiles, thereby enabling generation of images having high realism and high visual fidelity in real time or near-real time. The method enables in creating the at least one 3D data structure that is space-efficient and is susceptible to be used for reconstructing images from various new viewpoints. This is because the reference information pertaining to colour images and depth images is stored in the nodes of the at least one 3D data structure, rather than storing the colour images and the depth images therein. This makes the method and the system more memory-efficient, as compared to the prior art.

Moreover, the reference information does not include any redundancy, and can be updated easily in the at least one 3D data structure. The method can be easily scaled up to a high enough quality on existing equipment. Furthermore, multiple reprojections and multiple resampling of input images are not required for generating the aforesaid 3D data structure. As a result, there is no degradation in image quality of reconstructed images, and a higher visual quality can be achieved. The method and the system are simple, robust, support real-time high-quality 3D reconstruction, and can be implemented with ease.

Notably, the at least one server controls an overall operation of the system. In some implementations, the at least one server is implemented as a remote server. In such implementations, the remote server receives the plurality of colour images and the plurality of depth images from the at least one data repository, or from a device comprising at least one camera. In an example, the remote server could be a cloud server that provides a cloud computing service. Examples of the device include, but are not limited to, a head-mounted display device and a teleport device. In other implementations, the at least one server is implemented as a processor of the device comprising the at least one camera or as a processor of a computing device communicably coupled to the device. Examples of the computing device include, but are not limited to, a laptop, a desktop, a tablet, a phablet, a personal digital assistant, a workstation, and a console.

The term "head-mounted display" device refers to a specialized equipment that is configured to present an extended-reality (XR) environment to a user when said HMD device, in operation is worn by a user on his/her head. The HMD device is implemented, for example, as an XR headset, a pair of XR glasses, and the like, that is operable to display a scene of the XR environment to the user. The term "extended-reality" encompasses virtual reality (VR), augmented reality (AR), mixed reality (MR), and the like. The term "teleport device" refers to a specialized equipment that is capable of facilitating virtual teleportation.

It will be appreciated that the term "at least one server" refers to "a single server" in some implementations, and to "a plurality of servers" in other implementations. When the system comprises the single server, all operations of the system can be performed by the single server. When the system comprises the plurality of servers, different operations of the system can be performed by different (and specially configured) servers from amongst the plurality of servers. As an example, a first server from amongst the plurality of servers may be configured to divide the three-dimensional (3D) space occupied by the given real-world environment into the at least one 3D grid of voxels, and a second server from amongst the plurality of servers may be configured to map the given colour tile to the at least one voxel whose colour information is captured in the given colour tile.

It will also be appreciated that the at least one data repository could be implemented, for example, such as a memory of the at least one server, a memory of the device, a memory of the computing device, a removable memory, a cloud-based database, or similar.

Throughout the present disclosure, the term "camera" refers to an equipment that is operable to detect and process light signals received from the given real-world environment, so as to capture image(s) of the given real-world environment. Such images could be colour images and/or depth images of the given real-world environment. Optionally, the at least one camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, and a monochrome camera. Alternatively, optionally, the at least one camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, and an infrared (IR) camera.

In some implementations, both the given colour image and the given depth image are captured using a single camera. As an example, the aforesaid images may be captured as an RGB-D image using the single camera. In other implementations, the given colour image and the given depth image are captured separately by using separate cameras. As an example, the given colour image may be captured by an RGB camera, while the given depth image may be captured by a ToF camera. In yet other implementations, the given colour image is captured using a visible-light camera, and the given depth image is generated (for example, by the at least one server) using one of:

- stereo disparity between a stereo pair of visible-light images captured by the visible-light camera,
- a 3D model of the given real-world environment and a viewpoint of the at least one camera, the 3D model being a data structure comprising comprehensive information pertaining to the 3D space of the given real-world environment.

It will be appreciated that the given depth image could also be generated using at least one of: depth from focus, depth from reflectance, depth from shading, when the at least one camera has at least one of: a coded aperture, a sensor chip having phase detection autofocus (PDAF) pixels, a sensor chip in which some of its pixels are IR pixels. Such IR pixels can detect, for example, a structured light at an active-IR illumination. It will also be appreciated that the given depth image could be generated even without using the depth camera. In this regard, the given depth image could be generated by using at least one of: a neural network model, a monocular depth estimation technique, a monochrome image. The monocular depth estimation technique may employ a single (monocular) RGB image for estimating depth values to generate the given depth image.

It is to be understood that the given colour image is a visual representation of the given real-world environment. The term "visual representation" encompasses colour information represented in the given colour image, and additionally optionally other attributes associated with the given colour image (for example, such as depth information, luminance information, transparency information, and the like). Optionally, the colour information represented in the given colour image is in form of at least one of: Red-Green-Blue (RGB) values, Red-Green-Blue-Alpha (RGB-A) values, Cyan-Magenta-Yellow-Black (CMYK) values, Luminance and two-colour differences (YUV) values, Red-Green-Blue-Depth (RGB-D) values, Hue-Chroma-Luminance (HCL) values, Hue-Saturation-Lightness (HSL) values, Hue-Saturation-Brightness (HSB) values, Hue-Saturation-Value (HSV) colour space, Hue-Saturation-Intensity (HSI) values, blue-difference and red-difference chroma components (YCbCr) values.

Furthermore, the term "depth image" refers to an image comprising information pertaining to optical depths of objects or their parts present in the given real-world environment. In other words, the depth image provides information pertaining to distances (namely, the optical depths) of surfaces of the objects or their parts from a given viewpoint and a given viewing direction of the at least one camera. In an example, the depth image could be an image comprising a plurality of pixels, wherein a pixel value of each pixel in said image indicates an optical depth of its corresponding real point/region within the given real-world environment. The term "object" refers to a physical object or a part of the physical object present in the given real-world environment. The object could be a living object (for example, such as a human, a pet, a plant, and the like) or a non-living object (for example, such as a wall, a window, a toy, a poster, a lamp, and the like).

Throughout the present disclosure, the term "viewpoint" encompasses both a viewing position at which the at least one camera is positioned in the given real-world environment as well as a viewing direction in which the at least one camera is capturing the given colour image and the given depth image. It will be appreciated that multiple objects or their parts present in the given real-world environment span across a field of view of the at least one camera; therefore, for the given colour image that is captured from a given viewpoint, light reflecting off these objects or their parts is incident upon a sensor chip of the at least one camera at different incident angles. As an example, when an angular width of a horizontal field of view of the at least one camera is 90 degrees, these objects or their parts are captured in the given colour image such that information pertaining to the objects or their parts is captured from −45 degrees to +45 degrees from a centre of the horizontal field of view. Thus, a given viewpoint from which a given object or its part is captured not only depends on a viewing position and a viewing direction of the at least one camera, but also depends on which part of the field of view of at least one camera is the given object or its part captured.

Optionally, the system further comprises tracking means for tracking viewpoints of the at least one camera. It will be appreciated that the tracking means could be implemented as at least one of: an optics-based tracking system (which utilizes, for example, infrared beacons and detectors, IR cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). Optionally, a processor of the device is configured to process tracking data, collected by the tracking means, for tracking the viewpoints of the at least one camera. The tracking means may employ an outside-in tracking technique, an inside-out tracking technique, or a combination of both the aforesaid techniques, for collecting the tracking data. The tracking data may be in form of images, IMU/TIMU values, motion sensor data values, magnetic field strength values, or similar.

Optionally, the at least one camera is arranged on the device present in the given real-world environment. Such a device could be arranged at a fixed location within the given real-world environment. Optionally, in such a case, the device is stationary in the given real-world environment. Additionally or alternatively, the device could be a wearable device being worn by a user present in the given real-world environment. In such a case, a location of the device changes with a change in a location of its user. Likewise, the device could be arranged on, for example, a drone, a robot, or similar. As an example, the device could be arranged on a support structure that is capable of a 3D rotation (and additionally, capable of a translation motion). The support structure can be moved to any required location in the given real-world environment. In some implementations, a plurality of such devices may employ peer-to-peer (P2P) computing for implementing the aforementioned method of the present disclosure.

Optionally, the at least one camera is movable in the given real-world environment, so as to capture the plurality of colour images and the plurality of depth images from a plurality of viewpoints. In this regard, a pose of the at least one camera changes, i.e., at least an orientation of the at least one camera changes with respect to time. It will be appreciated that at least the orientation of the at least one camera may be adjusted (namely, changed) by using a motorised actuator. In such a case, information pertaining to at least the orientation of the at least one camera can be accurately known to the at least one server. The actuator may be driven by an actuation signal, for example, such as a piezoelectric force, an electromagnetic force, a mechanical torque, an electric current, or similar. Notably, different poses of the at least one camera serve as different (known) viewpoints for capturing the plurality of colour images and the plurality of depth images. The term "pose" encompasses both a position and an orientation.

Notably, the given coordinate system defines a position and an orientation of a given viewpoint (from which the given colour image and the given depth image are captured) within the 3D space of the given real-world environment. As an example, the given coordinate system may be a Cartesian coordinate system. Optionally, the given coordinate system has a predefined origin and three mutually perpendicular coordinate axes. The three mutually perpendicular coordinate axes could be, for example, X, Y, and Z axes. Optionally, in this regard, the position in the given coordinate system is expressed as (x, y, z) position coordinates along the X, Y and Z axes, respectively. Likewise, the orientation in the given coordinate system could be expressed, for example, using rotation quaternions, Euler angles, rotation matrices, and the like.

Throughout the present disclosure, the term "voxel" refers to a 3D volumetric element that constitutes a portion of the 3D space occupied by the given real-world environment. Multiple voxels can be employed to represent the 3D space occupied by the given real-world environment. A given voxel corresponding to the portion of the 3D space includes colour information pertaining to the portion of the 3D space, and additionally optionally other attributes associated with the portion of the 3D space (for example, such as depth information, luminance information, transparency information, opacity information, and the like). The given voxel can be considered to be a 3D equivalent of a pixel. A shape of the given voxel could be a cube or a cuboid. Voxels are well-known in the art.

Optionally, the at least one server is configured to divide the 3D space into the at least one 3D grid of voxels using a space partitioning scheme. Examples of the space partitioning scheme include, but are not limited to, an Octree (including a Sparse Voxel Octree) Partitioning scheme, a Binary Space Partitioning (BSP) scheme, a Quadtree Partitioning scheme, a k-dimensional tree partitioning scheme, a bounding volume hierarchy (BVH) partitioning scheme, and a voxel hashing scheme. The at least one 3D grid of voxels enables in effectively modelling the 3D space of the given real-world environment. The technical benefit of representing the at least one 3D grid in the given coordinate system is that a location of the given voxel in the at least one 3D grid can be easily identified by the at least one server. It will be appreciated that the at least one 3D grid of voxels may be a regular 3D grid or an irregular 3D grid. However, the regular 3D grid is relatively easier to employ as compared to the irregular 3D grid because tessellation of the regular 3D grid is regular.

In an embodiment, the voxels in the at least one 3D grid are of varying sizes, wherein a size of a given voxel is a function of a distance of the given voxel from at least one viewpoint from which at least one of the plurality of colour images is captured. In this regard, lesser the distance of the given voxel from the at least one viewpoint, lesser is the size of the given voxel in the at least one 3D grid, and vice versa. This is because when the distance of the given voxel from the at least one viewpoint is relatively lesser, visual information pertaining to a portion of the 3D region corresponding to the given voxel is represented in the at least one of the plurality of colour images at a higher resolution, and vice versa. In other words, when the distance of the given voxel from the at least one viewpoint is relatively lesser, the at least one viewpoint is closer to the portion of the 3D region represented by the given voxel, and thus the portion of the 3D region is represented in the at least one of the plurality of colour images with high visual fidelity. The technical benefit of employing the voxels of varying sizes is that it facilitates in dividing the 3D space into the at least one 3D grid of voxels having a spatially-variable resolution.

Optionally, a length of a side of the given voxel lies in a range of 0.1 centimetre (i.e., 1 millimetre) to 50 metres. More optionally, a length of a side of the given voxel lies in a range of 1 centimetre to 10 metres. Yet more optionally, a length of a side of the given voxel lies in a range of 10 centimetres to 2 metres. As an example, in a given 3D grid, some voxels may have each side measuring 5 millimetres, some other voxels may have each side measuring 20 centimetres, and remaining voxels may have each side measuring 1 metre. It will be appreciated that a range in which the length of the side of the given voxel may lie depends on whether the 3D space is an indoor space or an outdoor space. For example, when the 3D space represents an outdoor scenery, the length of the side of the given voxel may be in a range of 10 centimetres to 50 metres, wherein nearby objects in the outdoor scenery are represented by smaller voxels and faraway objects in the outdoor scenery are represented by larger voxels.

It will be appreciated that different voxels in the at least one 3D grid have different sizes according to different hierarchical levels, the different hierarchical levels depend on the distance of the given voxel from the at least one viewpoint, and optionally on visual detail (namely, a resolution) of the given voxel. In this regard, a given hierarchical level may correspond to a predefined range of distance of voxels from the at least one viewpoint, and optionally to a predefined range of resolutions of the voxels. Greater the hierarchical level, lesser is the distance of the given voxel from the at least one viewpoint, higher is the visual detail of the given voxel, and thus smaller is the size of the given voxel, and vice versa. As an example, the different hierarchical levels could be understood to begin at a root level, and to increase on going away from the root level towards a highest (i.e., deepest) level. In an example, for a first hierarchical level (i.e., a first level after the root level), each side of a given voxel may be 80 centimetres. For a second hierarchical level (i.e., an intermediate level after the first level), each side of a given voxel may be 30 centimetres. For a third hierarchical level (for example, a highest level after the intermediate level), each side of a given voxel may be 5 centimetres. The technical benefit of employing the different hierarchical levels is that it facilitates in dividing the 3D space into the at least one 3D grid of voxels having a spatially-variable resolution.

In another embodiment, the voxels in the at least one 3D grid have a same size. Such equi-sized voxels may be employed when the at least one 3D grid of voxels is a regular 3D grid. It will be appreciated that employing the equi-sized voxels in the at least one 3D grid is relatively simple and easier to implement.

Optionally, in the method, the step of dividing the 3D space comprises:
 initially dividing the 3D space into the voxels of a same size;
 identifying, based on at least two of the plurality of depth images and corresponding viewpoints from which the at least two of the plurality of depth images are captured, at least one voxel that includes at least one object having a self-occluding geometry; and
 iteratively dividing the at least one voxel into smaller voxels.

In this regard, prior to dividing the voxel(s) into smaller voxels, the 3D space is divided into equi-sized voxels. Since the plurality of depth images and the viewpoint information are readily available to the at least one server, information pertaining to a geometry of the at least one object can be easily known from depth information represented in the at least two of the plurality of depth images that are captured from different viewpoints. Thus, it can be easily identified whether the at least one object has the self-occluding geometry. It will be appreciated that the aforesaid identification is more accurately performed using depth images rather than using colour images, as depth images captured from different viewpoints (namely, different perspectives) accurately reveal the geometry of the at least one object as compared to colour images captured from different viewpoints. Thus, the at least one voxel is iteratively divided into smaller voxels when the at least one object has the self-occluding geometry, for providing an improved accuracy of reconstructing the at least one object using the at least one 3D data structure. By the phrase "the at least one object having the self-occluding geometry", it is meant that the geometry of the at least one object is such that when the at least one object is viewed from the different viewpoints, at least one portion of the at least one object occlude at least one of other portions of the at least one object.

It will be appreciated that when at least two voxels in the at least one 3D grid include, for example, an object having low frequency features, the at least two voxels could be combined together into a single voxel. This is because the object having low frequency features could be acceptably accurately represented by the single voxel (of a larger size) as compared to the at least two voxels (of smaller sizes). In an example, the object having low frequency features could, for example, be a wall, a sky, a water body, and the like present in the given real-world environment.

In an example, when a single colour tile of a size 32×32 pixels represents an entirety of a painting hanging on a wall, it means that said painting is significantly far away from a viewpoint of the at least one camera, and thus said colour tile is utilized for updating coarser level of detail (i.e., low resolution information) in the at least one 3D data structure. When the same painting is significantly close to a viewpoint of the at least one camera, several colour tiles of sizes 32×32 pixels represent the entirety of the painting, and thus said colour tiles are utilized for updating finer level of detail (i.e., high resolution information) in the at least one 3D data structure.

It will be appreciated that a number of nodes in the at least one 3D data structure is equal to a number of voxels of the 3D space. Moreover, a given real-world 3D region (represented by at least one voxel) may correspond to more than one node of the at least one 3D data structure. Examples of the at least one 3D data structure include, but are not limited to, an octree, a Binary Space Partitioning (BSP) tree, a Quadtree, a bounding volume hierarchy (BVH), and hashed voxels. Creating the at least one 3D data structure is well-known in the art.

Optionally, the at least one 3D grid of voxels comprises a plurality of 3D grids of voxels having different granularity levels, wherein the at least one 3D data structure comprises a plurality of 3D data structures corresponding to respective ones of the plurality of 3D grids, wherein the method further comprises selecting a granularity level from amongst the different granularity levels, based on a frequency with which colour changes across the given colour tile of the given colour image, wherein the step of mapping comprises mapping the given colour tile of the given colour image to at least one voxel in a given 3D grid having the selected granularity level, and the step of storing comprises storing the reference information along with the viewpoint information in a given node of a given 3D data structure that represents the at least one voxel in the given 3D grid.

In this regard, the different granularity levels correspond to different levels of abstraction (namely, different levels of detail) with which reference information and viewpoint information pertaining to different colour tiles of the given colour image are stored in different 3D data structures. It will be appreciated that greater the granularity level of a given 3D grid, smaller is the sizes of voxels of the given 3D grid and finer is the given 3D grid, and vice versa. In an example implementation, a size of a voxel in a given 3D grid having a first granularity level is twice a size of a voxel in another given 3D grid having a second granularity level, the second granularity level being greater (i.e., finer) than the first granularity level. This means a voxel-based resolution (i.e., voxels per unit solid angle) is higher for the second granularity level, and is decreased to half for the first granularity level. The technical benefit of employing the plurality of 3D grids of voxels having different granularity levels is that it facilitates in capturing the visual details of the given real-world environment at different granular levels; this allows for reconstructing images having different resolutions as and when required.

In an example, for a first granularity level (i.e., a coarsest granularity level), each side of a given voxel may be 160 centimetres. For a second granularity level, each side of a given voxel may be 80 centimetres. For a third granularity level, each side of a given voxel may be 40 centimetres. For a fourth granularity level (i.e., a finest granularity level), each side of a given voxel may be 20 centimetres.

Moreover, a number of 3D grids is equal to a number of 3D data structures. Optionally, greater the frequency of colour change across the given colour tile of the given colour image, greater is the granularity level selected from amongst the different granularity levels, and vice versa. This is because a higher granularity level accurately and comprehensively represents colour information captured in the given colour tile of the given colour image, as compared to a lower granularity level. Upon selecting a (requisite) granularity level, the given 3D grid having the selected granularity level is utilized for mapping the given colour tile to the at least one voxel in the given 3D grid, and the given 3D data structure (corresponding to the aforesaid 3D grid) is utilized for storing the reference information along with the viewpoint information.

Throughout the present disclosure, the term "tile" of a given image refers to a segment of the given image. It will be appreciated that a given tile of the given image has a defined shape and/or size. In an example, a size of the given tile may be 32×32 pixels. In another example, a size of the given tile may be 50×100 pixels.

Notably, the given colour image and the given depth image are divided into the plurality of colour tiles and the plurality of depth tiles, respectively, in a manner that a number of colour tiles is equal to a number of depth tiles. In other words, a grid of colour tiles of the given colour image exactly matches with a grid of depth tiles of the given depth image both in a horizontal direction and a vertical direction. In this regard, colour information represented in the given colour tile and depth information represented in the given depth tile correspond to a same real-world region. Optionally, when dividing the given colour image and the given depth image, the at least one server is configured to employ at least image processing algorithm. Optionally, the at least image processing algorithm is at least one of: an image slicing algorithm, an image cropping algorithm, an image segmentation algorithm.

In some implementations, a resolution of the given colour image is same as a resolution of the given depth image. In this regard, a number of pixels in the given colour tile and a number of pixels in the given depth tile are same. In other implementations, a resolution of the given colour image is different from a resolution of the given depth image. Optionally, the resolution of the given colour image is greater than the resolution of the given depth image. In this regard, the number of pixels in the given colour tile are greater than the number of pixels in the given depth tile. Optionally, the plurality of colour images comprise mipmaps of a plurality of input colour images. In this regard, multiple mipmaps of a given input colour image could be received by the at least one server, for example, from the device comprising the at least one camera. It will be appreciated that a given mipmap of the given input colour image can be considered to be a given colour image that is to be subsequently processed by the at least one server. Thus, the at least one server performs the aforementioned steps of dividing, mapping, and storing for all the multiple mipmaps of the given input colour image. It will also be appreciated that the multiple mipmaps may comprise at least one of: a high-resolution mipmap corresponding to a portion of the given input colour image representing objects that are closer to the viewpoint of the at least one camera, a low-resolution mipmap corresponding to a portion of the given input colour image representing objects that are far from the viewpoint of the at least one camera. It will be appreciated that employing the aforesaid mipmaps facilitates in reducing undesirable visual artifacts (such as moiré effect) due to aliasing in the given colour image. Optionally, the processor of the device (comprising the at least one camera) is configured to generate the mipmaps of the plurality of input colour images by employing at least a mipmapping algorithm.

Notably, when mapping the given colour tile to the at least one voxel, the at least one voxel is associated with (namely, linked to) the given colour tile as the colour information of the at least one voxel is captured in the given colour tile. Since optical depths (i.e., the depth information) in the corresponding depth tile of the given depth image and (a 3D position and an orientation of) the given viewpoint are known, the at least one server can easily and accurately ascertain voxel(s) in the at least one 3D grid to which the given colour tile is to be mapped. Therefore, the at least one server ascertains a location of the at least one voxel in the at least one 3D grid whose colour information is captured in the given colour tile. In this regard, at least one of: coordinate geometry-based formula, trigonometry-based formula is employed for determining the location of the at least one voxel in the at least one 3D grid.

Upon mapping the given colour tile to the at least one voxel, the given node of the at least one 3D data structure is populated with the reference information and the viewpoint information corresponding to the given colour image and the given depth image. It will be appreciated that the given node does not actually store the given colour tile and the given depth tile, but instead stores only unique identification of the given colour tile and the given depth tile. Beneficially, this facilitates in saving space at the data repository in which the at least one 3D data structure is stored. Moreover, image reconstruction can be performed photo-realistically in real time or near-real time and in a bandwidth-efficient manner using the at least one 3D data structure. Furthermore, storing the viewpoint information is also beneficial since the viewpoint information is utilized for generating a perspective-correct representation of the given colour tile at a time of reconstructing new colour images using the at least one 3D data structure.

It will be appreciated that the given colour image and the given depth image could be identified using a running number index of the given colour image and of the given depth image, respectively. Optionally, the unique identification of the given tile (namely, the given colour tile of the given colour image and/or the given depth tile of the given depth image) comprises any one of:

position coordinates of at least one of four corners of the given tile of the given image, a row number and a column number of the given tile of the given image, position coordinates and dimensions in an atlas image, when tiles of the given image are packed into the atlas image.

As an example, when the tiles are equi-sized, position coordinates of only one corner, for example, a left upper corner of the given tile is required for the unique identification. It will be appreciated that information pertaining to the row number and the column number of the given tile may require lesser number of bits, as compared to position coordinates. The atlas image has been described hereinbelow in detail.

Optionally, the method further comprises:

packing, into an atlas image, colour tiles of the plurality of colour images and corresponding depth tiles of the plurality of depth images whose respective reference information is stored in at least one of the plurality of nodes; and updating the respective reference information to be indicative of respective locations of the colour tiles and the depth tiles in the atlas image.

Herein, the term "atlas image" refers to a type of image in which the colour tiles and the depth tiles are arranged (namely, packed). Even though the colour tiles and the depth tiles may typically have varying dimensions, the colour tiles and the depth tiles can be packed into the atlas image in a space-efficient manner. This is because a given tile could be packed in the atlas image, based on a size of the given tile, a shape of the given tile, whether the given tile can be rotated to fit better. Herein, the given tile encompasses the given colour tile and/or the given depth tile. In this way, a wastage of space in the atlas image is significantly reduced.

Optionally, the atlas image has one of: a Portable Network Graphics (PNG) file format, a Joint Photographic Experts Group (JPEG) file format, a Scalable Vector Graphics (SVG) file format, a Web Picture (WEBP) file format, a Tagged Image file format (TIFF). Out of the aforesaid image file formats, the PNG file format is more space-efficient, and provides a greater visual detail in the atlas image, as compared to other image file formats.

The respective locations of the colour tiles and the depth tiles in the atlas image could, for example, be expressed as position coordinates and dimensions of the colour tiles and the depth tiles in the atlas image. It will be appreciated that the at least one server is configured to execute a garbage collection process dynamically (i.e., continuously, periodically (for example, after every minute or after every 10 minutes), or intermittently (for example, after five minutes, and then again after 20 minutes, and so on), wherein the given tile whose reference information is no longer stored in any of the nodes is discarded (i.e., deleted). Moreover, in such a case, the given tile is not packed into the atlas image. Typically, the garbage collection process is a form of an automatic memory management in which a memory which was previously allocated but is no longer referenced, is reclaimed. Such a memory is called garbage. Garbage collection is well-known in the art.

Optionally, the method further comprises downscaling a given colour tile, prior to packing into the atlas image, when a frequency with which colour changes across the given colour tile is less than a predefined threshold frequency. Upon downscaling, an original resolution of the given colour tile is reduced to a new resolution, wherein the new resolution is a fraction of the original resolution. In an example, the new resolution of the given colour tile may lie in a range of $1/16$ to $1/2$ of the original resolution of the given colour tile. The frequency with which colour changes across the given colour image being less than the predefined threshold frequency means that the given colour image does not have significant high-frequency details (i.e., has low frequency details). In such a case, downscaling does not significantly lower image quality of the given colour tile, and is therefore optionally employed to efficiently manage a memory budget of the at least one server efficiently. Notably, storing a downscaled version of the given colour tile requires less storage memory, as compared to storing the given colour tile at its original resolution. This memory budget may be a memory capacity allocated at the at least one data repository. The frequency with which colour changes can be expressed in terms of error metrics (for example, such as MSE) or their derivatives (for example, such as Peak Signal-To-Noise Ratio (PSNR)). As an example, when the given colour tile represents at least a portion of a wall of solid colour, the frequency with which colour changes across the given colour tile may be less than the predefined threshold frequency. In such a case, the given colour tile may be downscaled, prior to packing into the atlas image, since its lower-resolution downscaled portion would produce acceptable image quality to depict the solid colour (having nil or minimal texture detailing).

Optionally, when downscaling the given colour tile, prior to packing into the atlas image, the at least one server is configured to employ at least one of: a binning technique, a down sampling technique, an averaging technique, an image scaling technique, a bilinear algorithm, a bicubic interpolation technique, a Lanczos resampling algorithm, a guided-filter downscaling algorithm. The aforesaid techniques and/or algorithms are well-known in the art.

In an embodiment, for each new colour image and a corresponding new depth image captured from a given viewpoint, the method further comprises:
  dividing said new colour image and said new depth image into a plurality of new colour tiles and a plurality of new depth tiles, respectively, wherein the plurality of new depth tiles correspond to respective ones of the plurality of new colour tiles;
  reconstructing a colour image from a perspective of the given viewpoint of said new colour image, using the at least one 3D data structure;
  dividing the reconstructed colour image into a plurality of reconstructed colour tiles;
  determining differences between the plurality of new colour tiles and respective ones of the plurality of reconstructed colour tiles; and
  for at least one new colour tile whose difference from a respective reconstructed colour tile exceeds a first predefined threshold difference,
    mapping the at least one new colour tile to at least one voxel in the at least one 3D grid whose colour information is captured in the at least one new colour tile, based on depth information captured in a corresponding new depth tile of said new depth image and the given viewpoint; and
    storing, in a given node of the at least one 3D data structure that represents the at least one voxel, reference information indicative of unique identification of the at least one new colour tile of said new colour image that captures the colour information of the at least one voxel and the corresponding new depth tile of said new depth image that captures the depth information, along with viewpoint information indicative of the given viewpoint from which said new colour image and said new depth image are captured.

In this regard, the (reconstructed) colour image is a visual representation of the given real-world environment from the perspective of the given viewpoint of the new colour image, said visual representation being generated using the at least one 3D data structure as described later. Division of the new colour image, the new depth image, and the reconstructed colour image is performed in a same manner as described earlier. The new colour image, the new depth image, and information pertaining to the given viewpoint are received by the at least one server from the device comprising the at least one camera, or from the data repository in real time or near-real time.

It will be appreciated that when the difference between the at least one new colour tile and the respective reconstructed colour tile exceeds the first predefined threshold difference, it can be understood that colour information represented in the at least one new colour tile and colour information represented in the reconstructed colour tile are significantly different from each other. Therefore, reference information pertaining to the at least one new colour tile capturing the (different) colour information is required to be stored (namely, retained) in the given node of the at least one 3D data structure as latest colour information is available from the perspective of the given viewpoint. Beneficially, this facilitates in saving a storage space at the at least one data repository as only those new colour tiles (and their corresponding new depth tiles) whose colour information is considerably distinct from colour information of existing reconstructed colour tiles are mapped and their reference information is stored in the at least one 3D data structure. Moreover, this also enables in accurate and realistic image reconstruction using the at least one 3D data structure as up-to-date information of the given real-world environment is available from the at least one 3D data structure.

Optionally, when determining the difference between the at least one new colour tile and the respective reconstructed colour tile, the at least one server is configured to employ a difference metric. In this regard, greater the value of the difference metric, greater is the difference between the at least one new colour tile and the respective reconstructed colour tile (in other words, lower the value of a similarity metric, lower is the similarity between the at least one new colour tile and the respective reconstructed colour tile). Thus, those new colour tiles whose colour information is considerably different from colour information of existing reconstructed colour tiles would contribute new colour information to the at least one 3D data structure, and thus the at least one server prioritizes such new colour tiles when allocating memory. For at least one new colour tile whose difference from a respective reconstructed colour tile does not exceed the first predefined threshold difference, such a new colour tile and its corresponding depth tile are discarded, and their reference information is not stored into the given node of the at least one 3D data structure. Optionally, in this regard, a fixed-size cache of tiles is maintained, wherein the difference metric or the similarity metric is employed to manage allocation and flushing (namely, deletion) of tiles in the cache. This allows to get rid of tiles that are no longer useful and have become obsolete, whilst maintaining only a limited number of useful tiles.

Optionally, the difference metric is based on at least one of: a Mean-Squared Error (MSE) value, a Peak Signal-to-Noise Ratio (PSNR) value, a Structural Similarity Index Measure (SSIM) value. In an example, when the difference metric is based on the SSIM value, the difference between the at least one new colour tile and the respective reconstructed colour tile is considered to exceed the first predefined threshold difference when the SSIM value is lower than a predefined threshold value.

In an alternative or additional embodiment, for each new colour image and a corresponding new depth image captured from a given viewpoint, the method further comprises:
  dividing said new colour image and said new depth image into a plurality of new colour tiles and a plurality of new depth tiles, respectively, wherein the plurality of new depth tiles correspond to respective ones of the plurality of new colour tiles;
  reconstructing a depth image from a perspective of the given viewpoint of said new depth image, using the at least one 3D data structure;
  dividing the reconstructed depth image into a plurality of reconstructed depth tiles;
  determining, for each of the plurality of new colour tiles, a difference between a corresponding new depth tile of said new depth image and a corresponding reconstructed depth tile of the reconstructed depth image; and
  for at least one new colour tile whose difference between a corresponding new depth tile of said new depth image and a corresponding reconstructed depth tile of the reconstructed depth image exceeds a second predefined threshold difference,
    mapping the at least one new colour tile to at least one voxel in the at least one 3D grid whose colour information is captured in the at least one new colour tile, based on depth information captured in the corresponding new depth tile of said new depth image and the given viewpoint; and
    storing, in a given node of the at least one 3D data structure that represents the at least one voxel, reference information indicative of unique identification of the at least one new colour tile of said new colour image that captures the colour information of the at least one voxel and the corresponding new depth tile of said new depth image that captures the depth information, along with viewpoint information indicative of the given viewpoint from which said new colour image and said new depth image are captured.

In this regard, the (reconstructed) depth image represents depth information (for example, such as optical depths) pertaining to objects or their parts present in the given real-world environment from the perspective of the given viewpoint of the new depth image, said optical depths being determined the at least one 3D data structure. Division of the new colour image, the new depth image, and the reconstructed depth image is performed in a same manner as described earlier. As discussed in the previous embodiment, when the difference between the corresponding new depth tile and the corresponding reconstructed depth tile exceeds the second predefined threshold difference, it can be understood that depth information represented in the corresponding new depth tile and depth information represented in the corresponding reconstructed depth tile are significantly different from each other. Therefore, reference information pertaining to the corresponding new depth tile capturing the (different) depth information is required to be stored in the given node of the at least one 3D data structure as latest depth information is available from the perspective of the given viewpoint. Beneficially, this facilitates in saving a storage space at the at least one data repository as only those new depth tiles (and their corresponding new colour tiles) whose depth information is considerably distinct from depth information of existing reconstructed depth tiles are mapped to the at least one voxel and their reference information is subsequently stored in the given node of the at least one 3D data structure. Moreover, this also enables in accurate and realistic image reconstruction using the at least one 3D data structure as up-to-date information of the given real-world environment is available from the at least one 3D data structure.

Optionally, when determining the difference between the corresponding new depth tile and the corresponding reconstructed depth tile, the at least one server is configured to employ a difference metric, as discussed earlier. In this regard, greater the value of the difference metric, greater is the difference between the at least one new depth tile and the respective reconstructed depth tile (in other words, lower the value of a similarity metric, lower is the similarity between the at least one new depth tile and the respective reconstructed depth tile). For at least one new depth tile (and its corresponding colour tile) whose difference between the corresponding new depth tile and the corresponding reconstructed depth tile does not exceed the second predefined threshold difference, such a new depth tile and its corresponding colour tile are discarded, and their reference information is not stored into the given node of the at least one 3D data structure.

Moreover, optionally, the method further comprises:
  detecting whether a given colour tile of a given colour image represents at least one dynamic object;
  when it is detected that a given colour tile of a given colour image represents at least one dynamic object, determining a set of nodes in which reference information indicative of unique identification of the given colour tile and a corresponding depth tile is stored along with viewpoint information indicative of a given viewpoint from which the given colour image is captured; and updating the at least one 3D data structure by deleting, from the nodes in said set, said reference information along with said viewpoint information.

Optionally, when detecting whether the given colour tile of the given colour image represents the at least one dynamic object, the at least one server is configured to employ at least one object detection algorithm. Examples of the at least one object detection algorithm include, but are not limited to, a K-means algorithm, an Iterative Self-Organizing Data Analysis Technique (ISODATA) algorithm, a geometric features matching algorithm, a logistic regression algorithm, a decision tree algorithm, a Naive Bayes classifier algorithm, a K-nearest neighbours (KNN) algorithm, a Support Vector Machine (SVM) algorithm. It is to be understood that the at least one dynamic object is an object present in the given real-world environment whose properties (such as a pose, a shape, a size, and the like) change with respect to time. Examples of the at least one dynamic object include, but are not limited to, a human, an animal, a robot. The detection of whether the given colour tile of the given colour image represents the at least one dynamic object could be performed on a per-pixel basis. In other words, it may be detected whether each pixel in the given colour tile of the given colour image is representative of the at least one dynamic object.

It will be appreciated that since the properties of the at least one dynamic object change with respect to time (for example, such as when a pose of the at least one dynamic object changes within the given real-world environment), both colour information and depth information corresponding to the at least one dynamic object may change at different instants of time. In such a case, when new images are to be reconstructed using the at least one 3D data structure, reference information that is previously stored at the at least one 3D data structure may become obsolete (i.e., incorrect and inconsistent). Therefore, the set of nodes in which the aforesaid reference information is stored along with viewpoint information is identified and the aforesaid reference information and corresponding viewpoint information is then deleted, so as to update the at least one 3D data structure. The set of nodes comprises at least one node.

Optionally, the step of detecting whether the given colour tile of the given colour image represents the at least one dynamic object is performed when it is detected (by the at least one server) that a difference between the given tile (whose reference information is already stored in the at least one 3D data structure) and a new tile (whose reference information is to be stored in the at least one 3D data structure) exceeds a given predefined threshold difference. The given tile encompasses the given colour tile and/or the given depth tile. The given predefined threshold difference encompasses the first predefined threshold difference and/or the second predefined threshold difference.

Additionally, optionally, the method further comprises updating the at least one 3D data structure by storing, in at least one other node that represents at least one voxel in which the at least one dynamic object is currently located, new reference information indicative of unique identification of a new colour tile of a new colour image that captures colour information of the at least one voxel and a corresponding new depth tile of a new depth image along with viewpoint information indicative of a given viewpoint from which the new colour image and the new depth image are captured.

Furthermore, optionally, for a new viewpoint from a perspective of which a given output colour image is to be reconstructed using the at least one 3D data structure, the method further comprises:
    determining a set of visible nodes whose corresponding voxels are visible from the new viewpoint;
    for a given visible node of said set, selecting, from amongst colour tiles and depth tiles whose respective reference information is stored in the given visible node, at least one colour tile and at least one corresponding depth tile whose corresponding viewpoint matches the new viewpoint most closely; and
    reconstructing the given output colour image from colour tiles that are selected for each visible node of said set, based on corresponding depth tiles that are selected therefor.

In this regard, the set of visible nodes whose corresponding voxels are visible from the new viewpoint could be determined as nodes lying along a viewing direction defining the perspective from the new viewpoint. The set of visible nodes comprises at least one node. It will be appreciated that information pertaining to the new viewpoint could be received by the at least one server from a client device of a user. Upon performing the reconstruction, the at least one server then sends the given output colour image to the client device for subsequent displaying thereat.

Optionally, in the method, the step of reconstructing comprises reprojecting the colour tiles that are selected for each visible node of said set to match the new viewpoint, based on the corresponding depth tiles that are selected therefor. When the viewpoint of the selected at least one colour tile (and the at least one corresponding depth tile) of the given visible node is different from the new viewpoint, there would be some offset/skewness in the selected at least one colour tile (and the at least one corresponding depth tile) from the perspective of the new viewpoint. In such a case, the at least one server is configured to reproject (namely, warp) the selected at least one colour tile and the at least one corresponding depth tile to match the perspective of the new viewpoint, according to a difference between the viewpoint of the selected at least one colour tile and the new viewpoint. Optionally, when warping the colour tiles, the at least one server is configured to employ at least one image reprojection algorithm. The at least one image reprojection algorithm comprises at least one space-warping algorithm. Such image reprojection algorithms are well-known in the art.

Moreover, optionally, the method further comprises:
    determining an error in the given viewpoint from which the given colour image and the given depth image are captured;
    correcting the given viewpoint based on the error;
    re-mapping the given colour tile of the given colour image to at least one correct voxel in the at least one 3D grid whose colour information is captured in the given colour tile, based on the depth information captured in the corresponding depth tile of the given depth image and the corrected given viewpoint; and
    updating the at least one 3D data structure by storing, in a given correct node that represents the at least one correct voxel, the reference information indicative of the unique identification of the given colour tile of the given colour image and the corresponding depth tile of the given depth image, along with corrected viewpoint information indicative of the corrected given viewpoint.

Optionally, when determining the error in the given viewpoint from which the given colour image and the given depth image are captured, the at least one server is configured to:
determine a plurality of common features that are present in the given colour image and a previously-captured colour image; and
determine a spatial transformation that aligns the plurality of common features as extracted from the given colour image with the plurality of common features as extracted from the previously-captured given colour image, wherein the spatial transformation is indicative of a change in viewpoint between the given viewpoint measured corresponding to the given colour image and a previously-measured viewpoint corresponding to the previously-captured given colour image, wherein when correcting the given viewpoint, the at least one server is configured to apply the spatial transformation to the given viewpoint to obtain the corrected given viewpoint.

Optionally, in this regard, the at least one server is configured to compare the features extracted from the given colour image with the features extracted from the previously-captured given colour image, wherein matching features that are present in both the given colour image and the previously-captured given colour image are determined (namely, identified) as the plurality of common features. It will be appreciated that during a time period (for example, such as 100 milliseconds) between capturing the given colour image and the previously-captured given colour image, a viewpoint of the at least one camera may have changed in a manner that some features that are present in the given colour image are also present in the previously-captured given colour image. Moreover, there would be offsets between positions/orientations of such common features in the given colour image and the previously-captured given colour image. Thus, the at least one server can accurately determine an offset between the given viewpoint and the previously-measured viewpoint, based on the spatial transformation that aligns the aforesaid common features. The at least one server beneficially utilizes the offset for correcting the given viewpoint of the at least one camera. Upon correction, an amount of pose drift is reduced and a need for loop closures is eliminated. In this manner, the given colour tile is accurately mapped to the at least one correct voxel, and minimal viewpoint error would be accumulated in the at least one 3D data structure. Additionally, the at least one 3D data structure is updated by deleting the reference information and the viewpoint information from an incorrect node (namely, the given node that represents the at least one voxel) in which said information was stored previously. Beneficially, this facilitates in improving accuracy of reconstructing new colour images using the at least one 3D data structure, in real time or near-real time. This is because reference information and viewpoint information corresponding to the given colour image is correctly registered in the at least one 3D data structure, and thus during reconstruction, pieces of reconstructed geometry of objects seamlessly align with each other, and the new colour images are generated more accurately and realistically.

Optionally, the at least one server is configured to employ at least one image processing algorithm for extracting a plurality of features from a given image. Examples of the at least one image processing algorithm include, but are not limited to, an edge-detection algorithm (for example, such as Canny edge detector), a corner-detection algorithm (for example, such as Harris & Stephens corner detector), a blob-detection algorithm (for example, such as Laplacian of Gaussian (LoG)-based blob detector), a feature descriptor algorithm (for example, such as Binary Robust Independent Elementary Features (BRIEF)), a feature detector algorithm (for example, such as Speeded Up Robust Features (SURF) feature detector).

It is to be understood that the viewpoint of the at least one camera generally encompasses extrinsic parameters of the at least one camera which includes the viewing position and the viewing direction of the at least one camera. Moreover, intrinsic parameters of the at least one camera can also vary when capturing different colour images, as such intrinsic parameters depend on how the at least one camera captures the colour images. However, such intrinsic parameters need not be received by the at least one server. Examples of intrinsic parameters include, but are not limited to, a focal length, an aperture, a field-of-view, and a resolution. As an example, when the at least one camera includes only a single camera, even in a case where a field of view of the single camera has changed due to zooming in, intrinsic parameters of the single camera for each colour tile are not required to be stored or received. This is because information pertaining to a range of sequence numbers of frames for which said field of view has been employed can be received by the at least one server. As an another example, when the at least one camera comprises a plurality of cameras, intrinsic parameters of a plurality of cameras could be set differently. However, even in a multi-camera set up, intrinsic parameters of the single camera are not required to be stored or received.

The present disclosure also relates to the system and to the computer program product as described above. Various embodiments and variants disclosed above, with respect to the aforementioned method, apply mutatis mutandis to the system and to the computer program product.

Optionally, when dividing the 3D space, the at least one server is configured to:
initially divide the 3D space into the voxels of a same size;
identify, based on at least two of the plurality of depth images and corresponding viewpoints from which the at least two of the plurality of depth images are captured, at least one voxel that includes at least one object having a self-occluding geometry; and
iteratively divide the at least one voxel into smaller voxels.

Optionally, the at least one 3D grid of voxels comprises a plurality of 3D grids of voxels having different granularity levels, wherein the at least one 3D data structure comprises a plurality of 3D data structures corresponding to respective ones of the plurality of 3D grids, wherein the at least one server is configured to select a granularity level from amongst the different granularity levels, based on a frequency with which colour changes across the given colour tile of the given colour image,
wherein when mapping, the at least one server is configured to map the given colour tile of the given colour image to at least one voxel in a given 3D grid having the selected granularity level, and when storing, the at least one server is configured to store the reference information along with the viewpoint information in a given node of a given 3D data structure that represents the at least one voxel in the given 3D grid.

Optionally, in the system, the at least one server is configured to:

pack, into an atlas image, colour tiles of the plurality of colour images and corresponding depth tiles of the plurality of depth images whose respective reference information is stored in at least one of the plurality of nodes; and update the respective reference information to be indicative of respective locations of the colour tiles and the depth tiles in the atlas image.

Optionally, in the system, the at least one server is configured to downscale a given colour tile, prior to packing into the atlas image, when a frequency with which colour changes across the given colour tile is less than a predefined threshold frequency.

Optionally, for each new colour image and a corresponding new depth image captured from a given viewpoint, the at least one server is configured to:

divide said new colour image and said new depth image into a plurality of new colour tiles and a plurality of new depth tiles, respectively, wherein the plurality of new depth tiles correspond to respective ones of the plurality of new colour tiles;

reconstruct a colour image from a perspective of the given viewpoint of said new colour image, using the at least one 3D data structure;

divide the reconstructed colour image into a plurality of reconstructed colour tiles;

determine differences between the plurality of new colour tiles and respective ones of the plurality of reconstructed colour tiles; and for at least one new colour tile whose difference from a respective reconstructed colour tile exceeds a first predefined threshold difference, map the at least one new colour tile to at least one voxel in the at least one 3D grid whose colour information is captured in the at least one new colour tile, based on depth information captured in a corresponding new depth tile of said new depth image and the given viewpoint; and store, in a given node of the at least one 3D data structure that represents the at least one voxel, reference information indicative of unique identification of the at least one new colour tile of said new colour image that captures the colour information of the at least one voxel and the corresponding new depth tile of said new depth image that captures the depth information, along with viewpoint information indicative of the given viewpoint from which said new colour image and said new depth image are captured.

Optionally, for each new colour image and a corresponding new depth image captured from a given viewpoint, the at least one server is configured to:

divide said new colour image and said new depth image into a plurality of new colour tiles and a plurality of new depth tiles, respectively, wherein the plurality of new depth tiles correspond to respective ones of the plurality of new colour tiles;

reconstruct a depth image from a perspective of the given viewpoint of said new depth image, using the at least one 3D data structure;

divide the reconstructed depth image into a plurality of reconstructed depth tiles;

determine, for each of the plurality of new colour tiles, a difference between a corresponding new depth tile of said new depth image and a corresponding reconstructed depth tile of the reconstructed depth image; and for at least one new colour tile whose difference between a corresponding new depth tile of said new depth image and a corresponding reconstructed depth tile of the reconstructed depth image exceeds a second predefined threshold difference, map the at least one new colour tile to at least one voxel in the at least one 3D grid whose colour information is captured in the at least one new colour tile, based on depth information captured in the corresponding new depth tile of said new depth image and the given viewpoint; and store, in a given node of the at least one 3D data structure that represents the at least one voxel, reference information indicative of unique identification of the at least one new colour tile of said new colour image that captures the colour information of the at least one voxel and the corresponding new depth tile of said new depth image that captures the depth information, along with viewpoint information indicative of the given viewpoint from which said new colour image and said new depth image are captured.

Optionally, in the system, the at least one server is configured to:

detect whether a given colour tile of a given colour image represents at least one dynamic object;

when it is detected that a given colour tile of a given colour image represents at least one dynamic object, determine a set of nodes in which reference information indicative of unique identification of the given colour tile and a corresponding depth tile is stored along with viewpoint information indicative of a given viewpoint from which the given colour image is captured; and update the at least one 3D data structure by deleting, from the nodes in said set, said reference information along with said viewpoint information.

Optionally, for a new viewpoint from a perspective of which a given output colour image is to be reconstructed using the at least one 3D data structure, the at least one server is configured to:

determine a set of visible nodes whose corresponding voxels are visible from the new viewpoint;

for a given visible node of said set, select, from amongst colour tiles and depth tiles whose respective reference information is stored in the given visible node, at least one colour tile and at least one corresponding depth tile whose corresponding viewpoint matches the new viewpoint most closely; and reconstruct the given output colour image from colour tiles that are selected for each visible node of said set, based on corresponding depth tiles that are selected therefor.

Optionally, when reconstructing, the at least one server is configured to reproject the colour tiles that are selected for each visible node of said set to match the new viewpoint, based on the corresponding depth tiles that are selected therefor.

Optionally, in the system, the at least one server is configured to:

determine an error in the given viewpoint from which the given colour image and the given depth image are captured;

correct the given viewpoint based on the error;

re-map the given colour tile of the given colour image to at least one correct voxel in the at least one 3D grid whose colour information is captured in the given colour tile, based on the depth information captured in the corresponding depth tile of the given depth image and the corrected given viewpoint; and update the at least one 3D data structure by storing, in a given correct node that represents the at least one correct voxel, the reference information indicative of the unique identification of the given colour tile of the given colour image and the corresponding depth tile of the given depth image, along with corrected viewpoint information indicative of the corrected given viewpoint.

DETAILED DESCRIPTION OF THE DRAWINGS

Referring to FIG. 1, illustrated is a block diagram of an architecture of a system 100 incorporating image-tiles-based environment reconstruction, in accordance with an embodiment of the present disclosure. The system 100 comprises at least one data repository (depicted as a data repository 102) and at least one server (depicted as a server 104). The data repository 102 is communicably coupled to the server 104.

It may be understood by a person skilled in the art that the FIG. 1 includes a simplified architecture of the system 100 for sake of clarity, which should not unduly limit the scope of the claims herein. It is to be understood that the specific implementation of the system 100 is provided as an example and is not to be construed as limiting it to specific numbers or types of servers and data repositories. The person skilled in the art will recognize many variations, alternatives, and modifications of embodiments of the present disclosure.

Figure 2A:
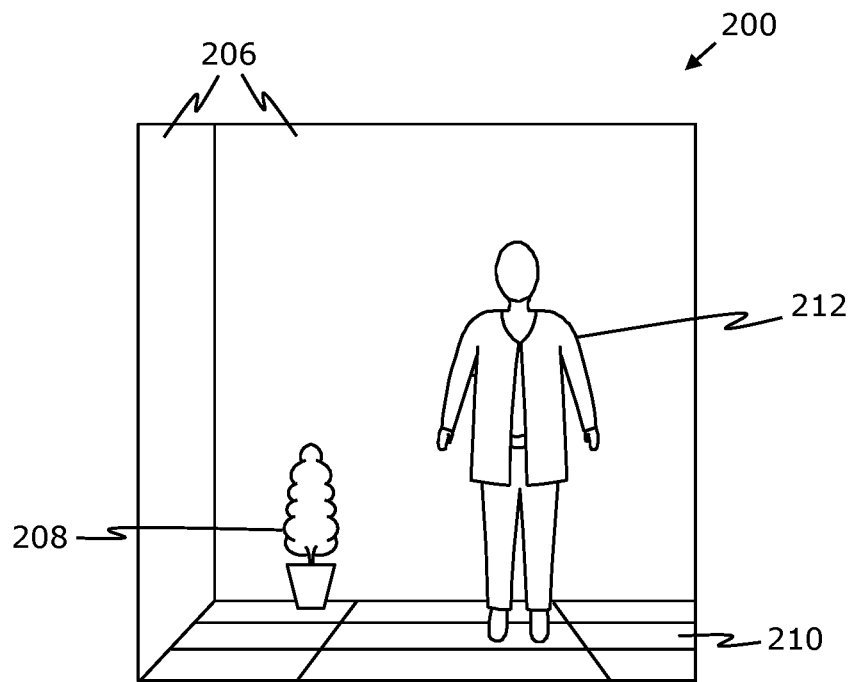
FIG. 2A illustrates an exemplary colour image of a real-world environment.
Figure 2B:
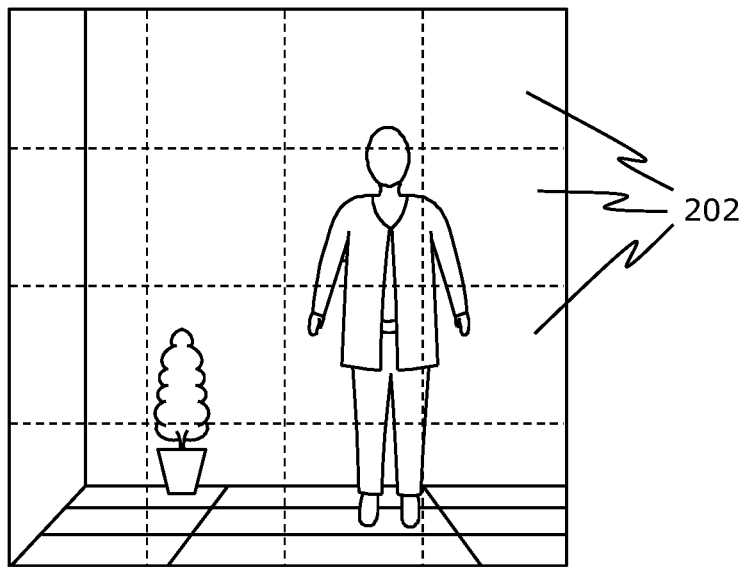
Figure 2C:
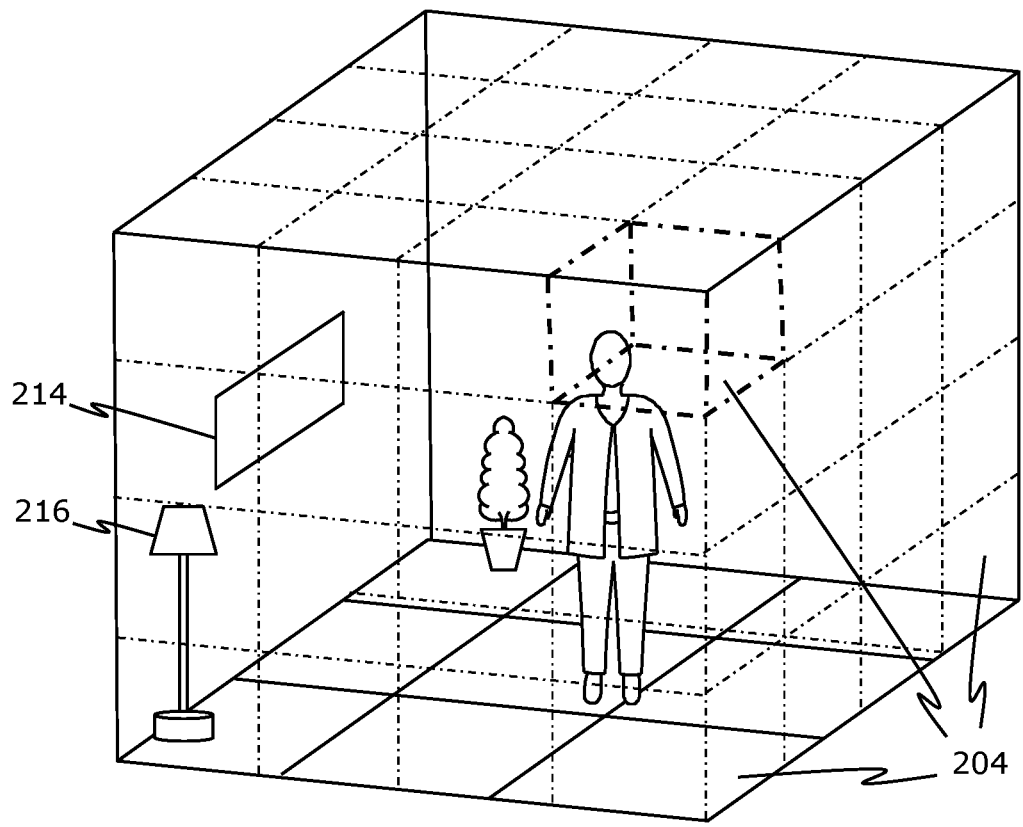
FIG. 2C illustrates a three-dimensional (3D) space occupied by the real-world environment being divided into a 3D grid of voxels, in accordance with an embodiment of the present disclosure.

Referring to FIGS. 2A, 2B, and 2C, FIG. 2A is a schematic representation of an exemplary colour image 200 of a real-world environment, FIG. 2B is a schematic representation of how the colour image 200 can be divided into a plurality of colour tiles 202, while FIG. 2C is a schematic representation of a three-dimensional (3D) space occupied by the real-world environment being divided into a 3D grid of voxels 204, in accordance with an embodiment of the present disclosure.

With reference to FIG. 2A, the colour image 200 is captured using a camera (not shown) from a particular pose of the camera. The colour image 200 represents a living room in the real-world environment, the living room comprising a plurality of objects, for example, walls 206, an indoor plant 208, a tiled floor 210, and a human 212 standing on the tiled floor 210.

With reference to FIG. 2B, the colour image 200 is shown to be divided into 16 equi-sized colour tiles (depicted as a 4×4 grid of dashed lines), for sake of simplicity. Similarly, a depth image (not shown) corresponding to the colour image 200 is divided into a plurality of depth tiles, wherein the plurality of depth tiles correspond to respective ones of the plurality of colour tiles 202.

With reference to FIG. 2C, the 3D space represents the living room in the real-world environment, the living room comprises a television 214 and a lamp 216 in addition to the aforementioned plurality of objects. The 3D space is shown to be divided into the 3D grid of 64 equi-sized voxels (depicted as a 4×4×4 3D grid of dash-dot lines). For sake of simplicity, the 3D space is divided into only 64 voxels, and one of the 64 voxels that is located at an upper right corner of the 3D space is shown in a complete 3D form.

FIGS. 2A-2C are merely examples, which should not unduly limit the scope of the claims herein. A person skilled in the art will recognize many variations, alternatives, and modifications of embodiments of the present disclosure.

Figure 3:
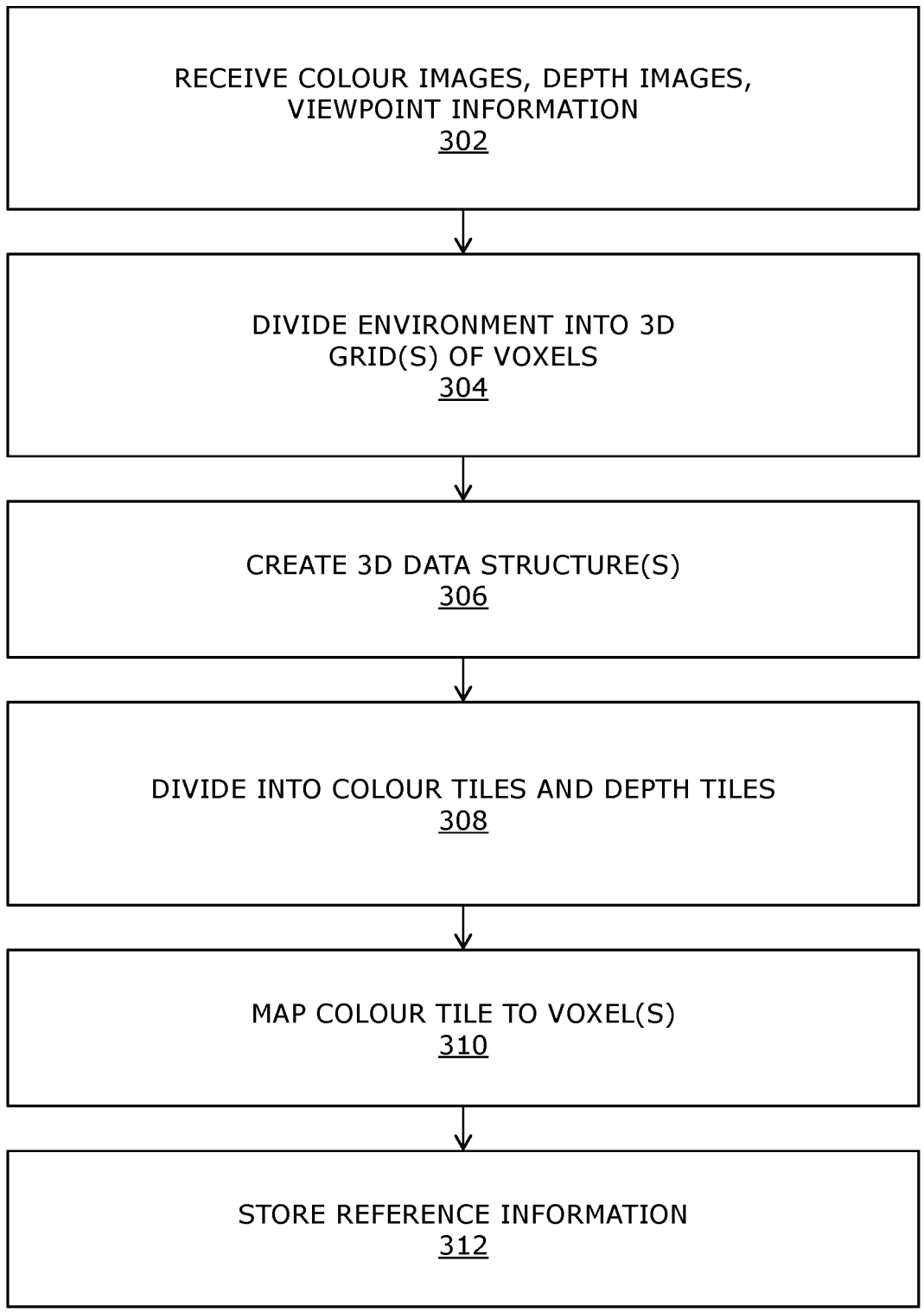
FIG. 3 illustrates steps of a computer-implemented method incorporating image-tiles-based environment reconstruction, in accordance with an embodiment of the present disclosure.

Referring to FIG. 3, illustrated are steps of a computer-implemented method incorporating image-tiles-based environment reconstruction, in accordance with an embodiment of the present disclosure. At step 302, there are received a plurality of colour images of a given real-world environment, a plurality of depth images corresponding to the plurality of colour images, and viewpoint information indicative of corresponding viewpoints from which the plurality of colour images and the plurality of depth images are captured, wherein three-dimensional (3D) positions and orientations of the viewpoints are represented in a given coordinate system. At step 304, a 3D space occupied by the given real-world environment is divided into at least one 3D grid of voxels, wherein the at least one 3D grid is represented in the given coordinate system. At step 306, at least one 3D data structure comprising a plurality of nodes is created, each node representing a corresponding voxel of the 3D space occupied by the given real-world environment. At step 308, a given colour image and a given depth image corresponding to the given colour image are divided into a plurality of colour tiles and a plurality of depth tiles, respectively, wherein the plurality of depth tiles correspond to respective ones of the plurality of colour tiles. At step 310, a given colour tile of the given colour image is mapped to at least one voxel in the at least one 3D grid whose colour information is captured in the given colour tile, based on depth information captured in a corresponding depth tile of the given depth image and a given viewpoint from which the given colour image and the given depth image are captured. At step 312, reference information is stored in a given node of the at least one 3D data structure representing the at least one voxel, wherein the reference information is indicative of unique identification of the given colour tile of the given colour image that captures the colour information of the at least one voxel and the corresponding depth tile of the given depth image that captures the depth information, along with viewpoint information indicative of the given viewpoint from which the given colour image and the given depth image are captured.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A computer-implemented method comprising:
   receiving a plurality of colour images of a given real-world environment, a plurality of depth images corresponding to the plurality of colour images, and viewpoint information indicative of corresponding viewpoints from which the plurality of colour images and the plurality of depth images are captured, wherein three-dimensional (3D) positions and orientations of the viewpoints are represented in a given coordinate system;
   dividing a 3D space occupied by the given real-world environment into at least one 3D grid of voxels, wherein the at least one 3D grid is represented in the given coordinate system;

creating at least one 3D data structure comprising a plurality of nodes, each node representing a corresponding voxel of the 3D space occupied by the given real-world environment;

dividing a given colour image and a given depth image corresponding to the given colour image into a plurality of colour tiles and a plurality of depth tiles, respectively, wherein the plurality of depth tiles correspond to respective ones of the plurality of colour tiles;

mapping a given colour tile of the given colour image to at least one voxel in the at least one 3D grid whose colour information is captured in the given colour tile, based on depth information captured in a corresponding depth tile of the given depth image and a given viewpoint from which the given colour image and the given depth image are captured; and storing, in a given node of the at least one 3D data structure representing the at least one voxel, reference information indicative of unique identification of the given colour tile of the given colour image that captures the colour information of the at least one voxel and the corresponding depth tile of the given depth image that captures the depth information, along with viewpoint information indicative of the given viewpoint from which the given colour image and the given depth image are captured.

2. The computer-implemented method of claim 1, wherein the voxels in the at least one 3D grid are of varying sizes, wherein a size of a given voxel is a function of a distance of the given voxel from at least one viewpoint from which at least one of the plurality of colour images is captured.

3. The computer-implemented method of claim 1, wherein the step of dividing the 3D space comprises:

initially dividing the 3D space into the voxels of a same size;

identifying, based on at least two of the plurality of depth images and corresponding viewpoints from which the at least two of the plurality of depth images are captured, at least one voxel that includes at least one object having a self-occluding geometry; and iteratively dividing the at least one voxel into smaller voxels.

4. The computer-implemented method of claim 1, wherein the at least one 3D grid of voxels comprises a plurality of 3D grids of voxels having different granularity levels, wherein the at least one 3D data structure comprises a plurality of 3D data structures corresponding to respective ones of the plurality of 3D grids, wherein the method further comprises selecting a granularity level from amongst the different granularity levels, based on a frequency with which colour changes across the given colour tile of the given colour image, wherein the step of mapping comprises mapping the given colour tile of the given colour image to at least one voxel in a given 3D grid having the selected granularity level, and the step of storing comprises storing the reference information along with the viewpoint information in a given node of a given 3D data structure that represents the at least one voxel in the given 3D grid.

5. The computer-implemented method of claim 1, wherein the plurality of colour images comprise mipmaps of a plurality of input colour images.

6. The computer-implemented method of claim 1, further comprising:

packing, into an atlas image, colour tiles of the plurality of colour images and corresponding depth tiles of the plurality of depth images whose respective reference information is stored in at least one of the plurality of nodes; and updating the respective reference information to be indicative of respective locations of the colour tiles and the depth tiles in the atlas image.

7. The computer-implemented method of claim 6, further comprising downscaling a given colour tile, prior to packing into the atlas image, when a frequency with which colour changes across the given colour tile is less than a predefined threshold frequency.

8. The computer-implemented method of claim 1, further comprising, for each new colour image and a corresponding new depth image captured from a given viewpoint, dividing said new colour image and said new depth image into a plurality of new colour tiles and a plurality of new depth tiles, respectively, wherein the plurality of new depth tiles correspond to respective ones of the plurality of new colour tiles;

reconstructing a colour image from a perspective of the given viewpoint of said new colour image, using the at least one 3D data structure;

dividing the reconstructed colour image into a plurality of reconstructed colour tiles;

determining differences between the plurality of new colour tiles and respective ones of the plurality of reconstructed colour tiles; and for at least one new colour tile whose difference from a respective reconstructed colour tile exceeds a first predefined threshold difference, mapping the at least one new colour tile to at least one voxel in the at least one 3D grid whose colour information is captured in the at least one new colour tile, based on depth information captured in a corresponding new depth tile of said new depth image and the given viewpoint; and storing, in a given node of the at least one 3D data structure that represents the at least one voxel, reference information indicative of unique identification of the at least one new colour tile of said new colour image that captures the colour information of the at least one voxel and the corresponding new depth tile of said new depth image that captures the depth information, along with viewpoint information indicative of the given viewpoint from which said new colour image and said new depth image are captured.

9. The computer-implemented method of claim 1, further comprising, for each new colour image and a corresponding new depth image captured from a given viewpoint, dividing said new colour image and said new depth image into a plurality of new colour tiles and a plurality of new depth tiles, respectively, wherein the plurality of new depth tiles correspond to respective ones of the plurality of new colour tiles;

reconstructing a depth image from a perspective of the given viewpoint of said new depth image, using the at least one 3D data structure;

dividing the reconstructed depth image into a plurality of reconstructed depth tiles;

determining, for each of the plurality of new colour tiles, a difference between a corresponding new depth tile of said new depth image and a corresponding reconstructed depth tile of the reconstructed depth image; and for at least one new colour tile whose difference between a corresponding new depth tile of said new depth image and a corresponding reconstructed depth tile of the reconstructed depth image exceeds a second predefined threshold difference,
  mapping the at least one new colour tile to at least one voxel in the at least one 3D grid whose colour information is captured in the at least one new colour tile, based on depth information captured in the corresponding new depth tile of said new depth image and the given viewpoint; and
  storing, in a given node of the at least one 3D data structure that represents the at least one voxel, reference information indicative of unique identification of the at least one new colour tile of said new colour image that captures the colour information of the at least one voxel and the corresponding new depth tile of said new depth image that captures the depth information, along with viewpoint information indicative of the given viewpoint from which said new colour image and said new depth image are captured.

10. The computer-implemented method of claim 1, further comprising:
  detecting whether a given colour tile of a given colour image represents at least one dynamic object;
  when it is detected that a given colour tile of a given colour image represents at least one dynamic object, determining a set of nodes in which reference information indicative of unique identification of the given colour tile and a corresponding depth tile is stored along with viewpoint information indicative of a given viewpoint from which the given colour image is captured; and
  updating the at least one 3D data structure by deleting, from the nodes in said set, said reference information along with said viewpoint information.

11. The computer-implemented method of claim 1, further comprising, for a new viewpoint from a perspective of which a given output colour image is to be reconstructed using the at least one 3D data structure,
  determining a set of visible nodes whose corresponding voxels are visible from the new viewpoint;
  for a given visible node of said set, selecting, from amongst colour tiles and depth tiles whose respective reference information is stored in the given visible node, at least one colour tile and at least one corresponding depth tile whose corresponding viewpoint matches the new viewpoint most closely; and
  reconstructing the given output colour image from colour tiles that are selected for each visible node of said set, based on corresponding depth tiles that are selected therefor.

12. The computer-implemented method of claim 11, wherein the step of reconstructing comprises reprojecting the colour tiles that are selected for each visible node of said set to match the new viewpoint, based on the corresponding depth tiles that are selected therefor.

13. The computer-implemented method of claim 1, further comprising:
  determining an error in the given viewpoint from which the given colour image and the given depth image are captured;
  correcting the given viewpoint based on the error;
  re-mapping the given colour tile of the given colour image to at least one correct voxel in the at least one 3D grid whose colour information is captured in the given colour tile, based on the depth information captured in the corresponding depth tile of the given depth image and the corrected given viewpoint; and
  updating the at least one 3D data structure by storing, in a given correct node that represents the at least one correct voxel, the reference information indicative of the unique identification of the given colour tile of the given colour image and the corresponding depth tile of the given depth image, along with corrected viewpoint information indicative of the corrected given viewpoint.

14. A computer program product comprising a non-transitory machine-readable data storage medium having stored thereon program instructions that, when executed by a processor, cause the processor to execute steps of the computer-implemented method of claim 1.

15. A system comprising at least one server and at least one data repository communicably coupled to the at least one server, wherein the at least one server is configured to:
  receive a plurality of colour images of a given real-world environment, a plurality of depth images corresponding to the plurality of colour images, and viewpoint information indicative of corresponding viewpoints from which the plurality of colour images and the plurality of depth images are captured, wherein three-dimensional (3D) positions and orientations of the viewpoints are represented in a given coordinate system;
  divide a 3D space occupied by the given real-world environment into at least one 3D grid of voxels, wherein the at least one 3D grid is represented in the given coordinate system;
  create at least one 3D data structure comprising a plurality of nodes, each node representing a corresponding voxel of the 3D space occupied by the given real-world environment, wherein the at least one 3D data structure is stored at the at least one data repository;
  divide a given colour image and a given depth image corresponding to the given colour image into a plurality of colour tiles and a plurality of depth tiles, respectively, wherein the plurality of depth tiles correspond to respective ones of the plurality of colour tiles;
  map a given colour tile of the given colour image to at least one voxel in the at least one 3D grid whose colour information is captured in the given colour tile, based on depth information captured in a corresponding depth tile of the given depth image and a given viewpoint from which the given colour image and the given depth image are captured; and
  store, in a given node of the at least one 3D data structure representing the at least one voxel, reference information indicative of unique identification of the given colour tile of the given colour image that captures the colour information of the at least one voxel and the corresponding depth tile of the given depth image that captures the depth information, along with viewpoint information indicative of the given viewpoint from which the given colour image and the given depth image are captured.

16. The system of claim 15, wherein the voxels in the at least one 3D grid are of varying sizes, wherein a size of a given voxel is a function of a distance of the given voxel from at least one viewpoint from which at least one of the plurality of colour images is captured.

17. The system of claim 15, wherein when dividing the 3D space, the at least one server is configured to:
  initially divide the 3D space into the voxels of a same size;

identify, based on at least two of the plurality of depth images and corresponding viewpoints from which the at least two of the plurality of depth images are captured, at least one voxel that includes at least one object having a self-occluding geometry; and iteratively divide the at least one voxel into smaller voxels.

18. The system of claim 15, wherein the at least one 3D grid of voxels comprises a plurality of 3D grids of voxels having different granularity levels, wherein the at least one 3D data structure comprises a plurality of 3D data structures corresponding to respective ones of the plurality of 3D grids, wherein the at least one server is configured to select a granularity level from amongst the different granularity levels, based on a frequency with which colour changes across the given colour tile of the given colour image, wherein when mapping, the at least one server is configured to map the given colour tile of the given colour image to at least one voxel in a given 3D grid having the selected granularity level, and when storing, the at least one server is configured to store the reference information along with the viewpoint information in a given node of a given 3D data structure that represents the at least one voxel in the given 3D grid.

19. The system of claim 15, wherein the plurality of colour images comprise mipmaps of a plurality of input colour images.

20. The system of claim 15, wherein the at least one server is configured to:

pack, into an atlas image, colour tiles of the plurality of colour images and corresponding depth tiles of the plurality of depth images whose respective reference information is stored in at least one of the plurality of nodes; and update the respective reference information to be indicative of respective locations of the colour tiles and the depth tiles in the atlas image.

21. The system of claim 20, wherein the at least one server is configured to downscale a given colour tile, prior to packing into the atlas image, when a frequency with which colour changes across the given colour tile is less than a predefined threshold frequency.

22. The system of claim 15, wherein for each new colour image and a corresponding new depth image captured from a given viewpoint, the at least one server is configured to:

divide said new colour image and said new depth image into a plurality of new colour tiles and a plurality of new depth tiles, respectively, wherein the plurality of new depth tiles correspond to respective ones of the plurality of new colour tiles;

reconstruct a colour image from a perspective of the given viewpoint of said new colour image, using the at least one 3D data structure;

divide the reconstructed colour image into a plurality of reconstructed colour tiles;

determine differences between the plurality of new colour tiles and respective ones of the plurality of reconstructed colour tiles; and for at least one new colour tile whose difference from a respective reconstructed colour tile exceeds a first predefined threshold difference, map the at least one new colour tile to at least one voxel in the at least one 3D grid whose colour information is captured in the at least one new colour tile, based on depth information captured in a corresponding new depth tile of said new depth image and the given viewpoint; and store, in a given node of the at least one 3D data structure that represents the at least one voxel, reference information indicative of unique identification of the at least one new colour tile of said new colour image that captures the colour information of the at least one voxel and the corresponding new depth tile of said new depth image that captures the depth information, along with viewpoint information indicative of the given viewpoint from which said new colour image and said new depth image are captured.

23. The system of claim 15, wherein for each new colour image and a corresponding new depth image captured from a given viewpoint, the at least one server is configured to:

divide said new colour image and said new depth image into a plurality of new colour tiles and a plurality of new depth tiles, respectively, wherein the plurality of new depth tiles correspond to respective ones of the plurality of new colour tiles;

reconstruct a depth image from a perspective of the given viewpoint of said new depth image, using the at least one 3D data structure;

divide the reconstructed depth image into a plurality of reconstructed depth tiles;

determine, for each of the plurality of new colour tiles, a difference between a corresponding new depth tile of said new depth image and a corresponding reconstructed depth tile of the reconstructed depth image; and for at least one new colour tile whose difference between a corresponding new depth tile of said new depth image and a corresponding reconstructed depth tile of the reconstructed depth image exceeds a second predefined threshold difference, map the at least one new colour tile to at least one voxel in the at least one 3D grid whose colour information is captured in the at least one new colour tile, based on depth information captured in the corresponding new depth tile of said new depth image and the given viewpoint; and store, in a given node of the at least one 3D data structure that represents the at least one voxel, reference information indicative of unique identification of the at least one new colour tile of said new colour image that captures the colour information of the at least one voxel and the corresponding new depth tile of said new depth image that captures the depth information, along with viewpoint information indicative of the given viewpoint from which said new colour image and said new depth image are captured.

24. The system of claim 15, wherein the at least one server is configured to:

detect whether a given colour tile of a given colour image represents at least one dynamic object;

when it is detected that a given colour tile of a given colour image represents at least one dynamic object, determine a set of nodes in which reference information indicative of unique identification of the given colour tile and a corresponding depth tile is stored along with viewpoint information indicative of a given viewpoint from which the given colour image is captured; and update the at least one 3D data structure by deleting, from the nodes in said set, said reference information along with said viewpoint information.

25. The system of claim 15, wherein for a new viewpoint from a perspective of which a given output colour image is to be reconstructed using the at least one 3D data structure, the at least one server is configured to:

determine a set of visible nodes whose corresponding voxels are visible from the new viewpoint;

for a given visible node of said set, select, from amongst colour tiles and depth tiles whose respective reference information is stored in the given visible node, at least one colour tile and at least one corresponding depth tile whose corresponding viewpoint matches the new viewpoint most closely; and reconstruct the given output colour image from colour tiles that are selected for each visible node of said set, based on corresponding depth tiles that are selected therefor.

26. The system of claim 25, wherein when reconstructing, the at least one server is configured to reproject the colour tiles that are selected for each visible node of said set to match the new viewpoint, based on the corresponding depth tiles that are selected therefor.

27. The system of claim 15, wherein the at least one server is configured to:

determine an error in the given viewpoint from which the given colour image and the given depth image are captured;

correct the given viewpoint based on the error;

re-map the given colour tile of the given colour image to at least one correct voxel in the at least one 3D grid whose colour information is captured in the given colour tile, based on the depth information captured in the corresponding depth tile of the given depth image and the corrected given viewpoint; and update the at least one 3D data structure by storing, in a given correct node that represents the at least one correct voxel, the reference information indicative of the unique identification of the given colour tile of the given colour image and the corresponding depth tile of the given depth image, along with corrected viewpoint information indicative of the corrected given viewpoint.

\* \* \* \* \*